United States Patent
Rong et al.

(10) Patent No.: US 9,949,285 B2
(45) Date of Patent: Apr. 17, 2018

(54) SYSTEM AND METHOD FOR DIGITAL COMMUNICATIONS WITH INTERFERENCE AVOIDANCE

(71) Applicant: Futurewei Technologies, Inc., Plano, TX (US)

(72) Inventors: Zhigang Rong, San Diego, CA (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 112 days.

(21) Appl. No.: 14/968,484

(22) Filed: Dec. 14, 2015

(65) Prior Publication Data

US 2016/0198358 A1 Jul. 7, 2016

Related U.S. Application Data

(60) Provisional application No. 62/100,651, filed on Jan. 7, 2015.

(51) Int. Cl.
*H04W 72/12* (2009.01)
*H04W 84/12* (2009.01)

(52) U.S. Cl.
CPC .... *H04W 72/1268* (2013.01); *H04W 72/1289* (2013.01); *H04W 84/12* (2013.01)

(58) Field of Classification Search
CPC ......... H04W 28/0289; H04W 28/0205; H04W 72/1268; H04W 72/1289; H04W 84/12
See application file for complete search history.

(56) References Cited

U.S. PATENT DOCUMENTS

| 2011/0305176 | A1 | 12/2011 | Wentink | |
|---|---|---|---|---|
| 2012/0300738 | A1 | 11/2012 | Palanki et al. | |
| 2013/0288697 | A1 | 10/2013 | Miao et al. | |
| 2013/0301569 | A1 | 11/2013 | Wang et al. | |
| 2015/0078352 | A1* | 3/2015 | Rong | H04J 3/16 370/336 |
| 2016/0087775 | A1* | 3/2016 | Hedayat | H04L 1/12 370/329 |

(Continued)

FOREIGN PATENT DOCUMENTS

| CN | 102449948 A | 5/2012 |
|---|---|---|
| CN | 102948101 A | 2/2013 |

(Continued)

OTHER PUBLICATIONS

Cariou, L., et al., "High-efficiency WLAN Straw poll," IEEE 802.11-13/0339r10, Mar. 19, 2013, 7 pages.

(Continued)

*Primary Examiner* — Benjamin H Elliott, IV
(74) *Attorney, Agent, or Firm* — Slater Matsil, LLP

(57) ABSTRACT

A method for communicating in a wireless communications system includes receiving an indicator indicating a utilization of network resources for carrying an acknowledgement information, and determining whether the station is permitted to transmit a packet. The method includes when the station is permitted to transmit the packet, determining a first location of a first network resource in accordance with the indicator, and transmitting the packet at the first location of the first network resource.

33 Claims, 11 Drawing Sheets

(56) References Cited

U.S. PATENT DOCUMENTS

| | | | |
|---|---|---|---|
| 2016/0100408 A1* | 4/2016 | Hedayat | H04L 65/4076 370/329 |
| 2016/0112987 A1* | 4/2016 | Patil | H04W 4/008 455/515 |
| 2016/0113034 A1* | 4/2016 | Seok | H04W 74/04 370/329 |
| 2016/0134406 A1* | 5/2016 | Chu | H04L 5/0037 370/329 |
| 2016/0165589 A1* | 6/2016 | Chu | H04L 5/0007 370/329 |
| 2016/0174200 A1* | 6/2016 | Seok | H04W 72/04 370/329 |
| 2016/0198358 A1* | 7/2016 | Rong | H04W 72/1268 370/235 |
| 2016/0316472 A1* | 10/2016 | Kwon | H04L 5/0055 |
| 2017/0079019 A1 | 3/2017 | Yang et al. | |

FOREIGN PATENT DOCUMENTS

| | | |
|---|---|---|
| CN | 103314609 A | 9/2013 |
| WO | 2012068141 A1 | 5/2012 |
| WO | 2013180521 A1 | 12/2013 |

OTHER PUBLICATIONS

Cariou, L., et al., "High-efficiency WLAN," IEEE 802.11-13/0331r5, Mar. 19, 2013, 21 pages.

* cited by examiner

SYSTEM AND METHOD FOR DIGITAL COMMUNICATIONS WITH INTERFERENCE AVOIDANCE

This application claims the benefit of U.S. Provisional Application No. 62/100,651, filed on Jan. 7, 2015, entitled "System and Method for Interference Management," which application is hereby incorporated herein by reference.

TECHNICAL FIELD

The present disclosure relates generally to digital communications, and more particularly to a system and method for digital communications with interference avoidance.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

A newly formed IEEE 802.11 Study Group named "High Efficiency WLAN (HEW)," also referred to as 802.11ax, has been formed to study, among other things, improving system performance in a high density environment. As a result of the work of the HEW Study Group, a Task Group called TGax has been formed.

SUMMARY OF THE DISCLOSURE

Example embodiments provide a system and method for digital communications with interference avoidance.

In accordance with an example embodiment, a method for communicating in a wireless communications system is provided. The method includes receiving, by a station, an indicator indicating a utilization of network resources for carrying an acknowledgement information, determining, by the station, whether the station is permitted to transmit a packet, and when the station is permitted to transmit the packet, determining, by the station, a first location of a first network resource in accordance with the indicator, and transmitting, by the station, the packet at the first location of the first network resource.

In accordance with an example embodiment, a method for communicating in a wireless communications system is provided. The method includes receiving, by a station, a scheduling information and a first indicator indicating a utilization of network resources for carrying an acknowledgement information, transmitting, by the station, a first transmission in accordance with the scheduling information, the first transmission including a second indicator that is a superset of the first indicator, and receiving, by the station, the acknowledgement information responsive to the first transmission.

In accordance with an example embodiment, a method for communicating in a wireless communications system is provided. The method includes transmitting, by an access point, scheduling information and a first indicator indicating a utilization of network resources, receiving, by the access point, a first transmission in accordance with the scheduling information, the first transmission including a second indicator that is a superset of the first indicator, and transmitting, by the access point, an acknowledgement information responsive to the first transmission, the acknowledgement information transmitted in accordance with the first indicator.

In accordance with another example embodiment, a station adapted to communicate in a wireless communications system is provided. The station includes a processor, and a computer readable storage medium storing programming for execution by the processor. The programming including instructions to configure the station to receive an indicator indicating a utilization of network resources for carrying an acknowledgement information, determine whether the station is permitted to transmit a packet, and when the station is permitted to transmit the packet, determine a first location of a first network resource in accordance with the indicator, and transmit the packet at the first location of the first network resource.

Practice of the foregoing embodiments allow for devices in overlapping basic service sets to signal their resource utilization so that other devices are able to transmit without interference by avoiding the use of the same resources Eliminating or reducing interference helps to improve overall communications system performance by reducing retransmissions.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for digital communications with interference avoidance. For example, a station receives an indicator indicating a utilization of network resources for carrying an acknowledgement information, and determines whether the station is permitted to transmit a packet. The station, when the station is permitted to transmit the packet, determines a first location of a first network resource in accordance with the indicator, and transmits the packet at the first location of the first network resource.

The embodiments will be described with respect to example embodiments in a specific context, namely communications systems that use signaling to manage interference. The embodiments may be applied to standards compliant communications systems, such as those that are compliant with Third Generation Partnership Project (3GPP), IEEE 802.11, and the like, technical standards, and non-standards compliant communications systems, that use signaling to manage interference.

Figure 1:
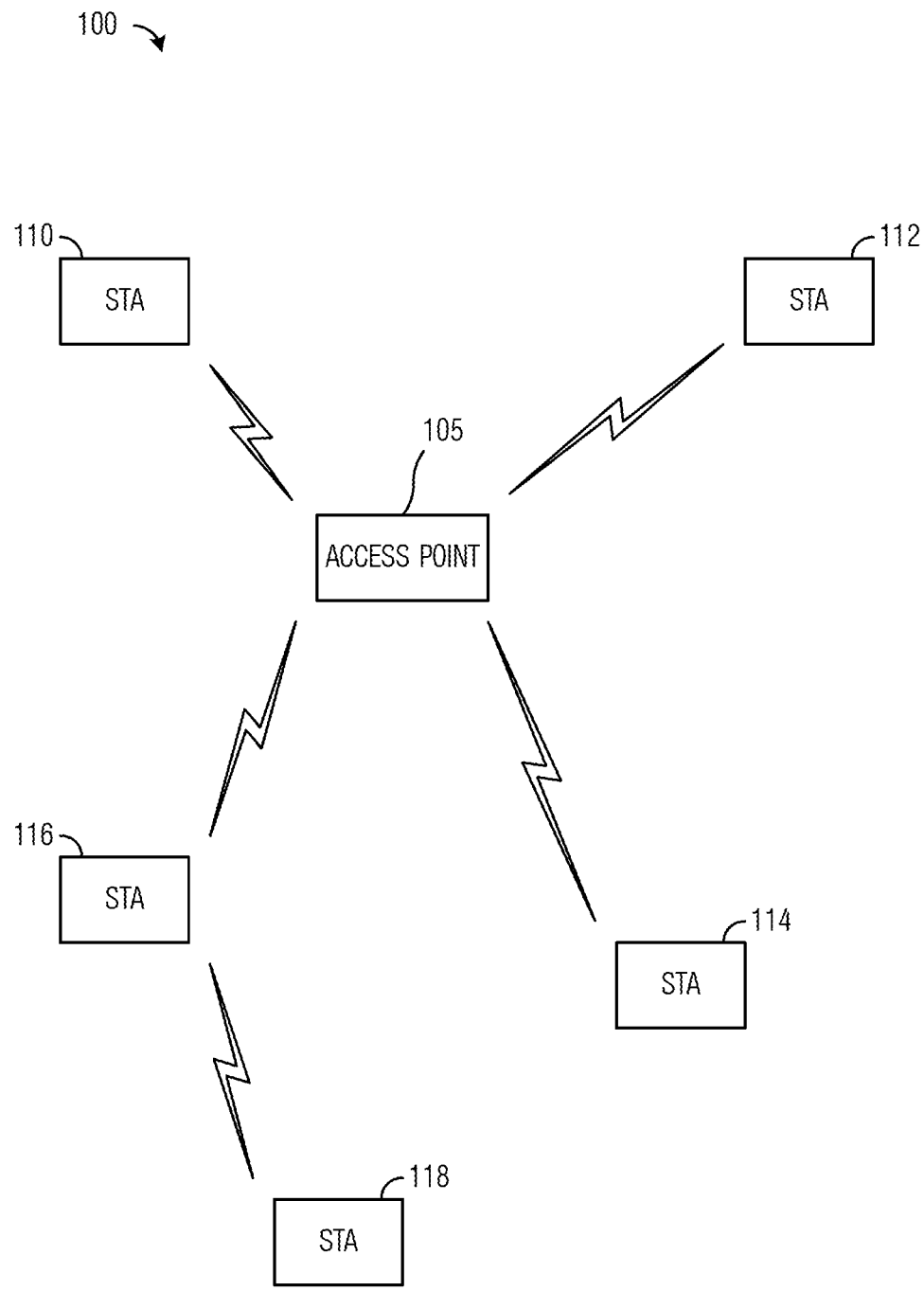
FIG. 1 illustrates an example wireless communications system according to example embodiments described herein.

FIG. 1 illustrates an example wireless communications system 100. Wireless communications system 100 includes an access point (AP) 105 that serves one or more stations, such as stations (STA) 110-118, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

While it is understood that communications systems may employ multiple APs capable of communicating with a number of UEs, only one AP, and a number of stations are illustrated for simplicity.

In WLANs, transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by stations in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
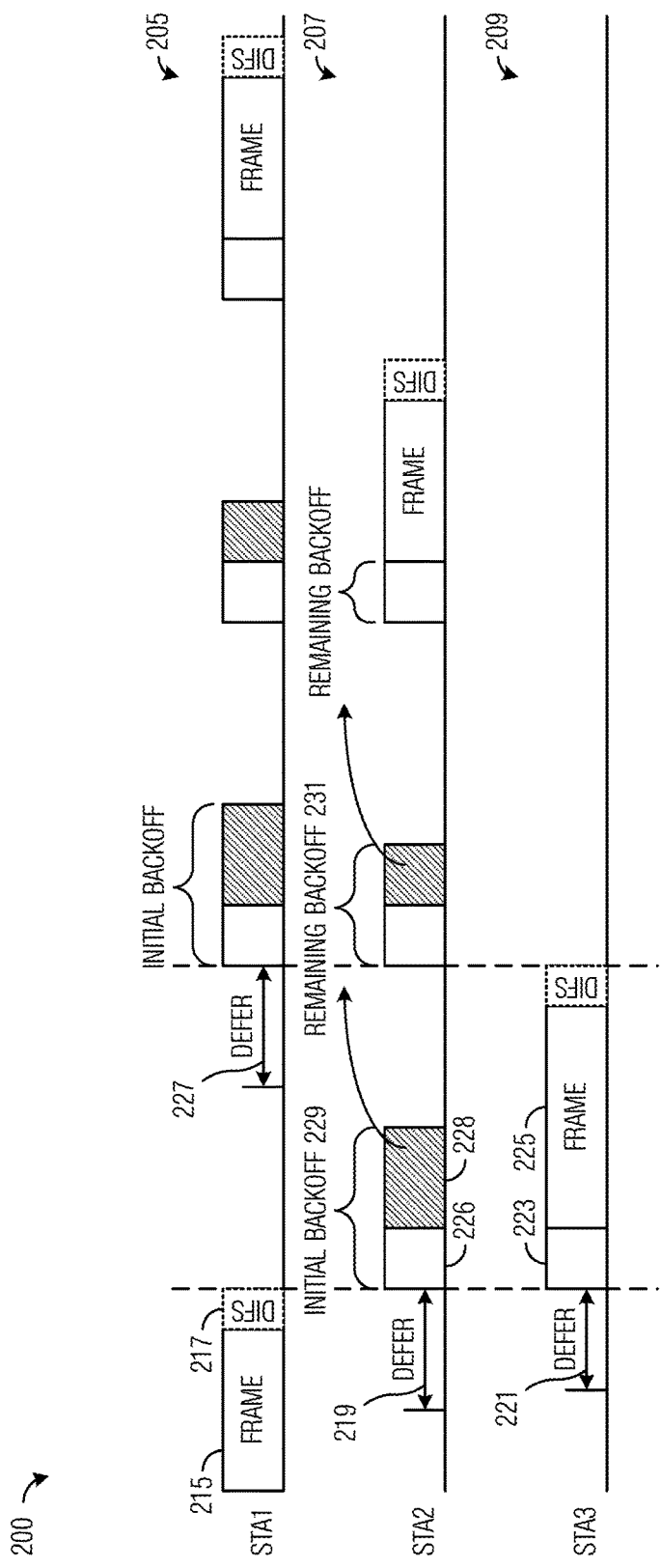
FIG. 2 illustrates a diagram of example channel access timing according to example embodiments described herein.

FIG. 2 illustrates a diagram 200 of example channel access timing. A first trace 205 represents channel access for a first station (STA1 202), a second trace 207 represents channel access for a second station (STA2 203), and a third trace 209 represents channel access for a third station (STA3 204). A short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

As shown in FIG. 2, STA1 is able to obtain access to the wireless channel and is able to transmit frame 215. While STA1 is transmitting frame 215, both STA2 and STA3 attempt to obtain access to the wireless channel, but since the wireless channel is busy, both defer (defer period 219 and defer period 221). Both STA2 and STA3 defer until one DIFS period 217 after the end of frame 215. Then STA2 and STA3 begin to contend for access to the wireless channel, by randomly selecting a backoff period to wait. After the random backoff period of a station expires, the station is permitted to contend for access to the wireless channel. As shown in FIG. 2, the random backoff period of STA3 is shorter (shown as period 223) than that of STA2, STA3 is able to obtain access to the wireless channel and transmits frame 225. During the random backoff period of STA2 (initial backoff 229), STA2 detects that the wireless channel becomes busy so STA2 stops counting down the random backoff period. The time interval between the start of the random backoff period of STA2 until when STA2 stops counting down (interval 226) plus the remaining backoff (interval 228) is referred to as an initial backoff 229. Similarly, while STA$_3$ is transmitting, STA1 detects that the wireless channel is busy and defers (defer period 227) until one DIFS period after the end of frame 225. One DIFS period after the end of frame 225, both STA1 and STA2 begin their backoff, with STA2 continuing its previously stopped random backoff period and STA1 randomly selecting a backoff period to wait. The time interval between when STA2 resumes the countdown of the random backoff period and the end of the random backoff period is referred to as a remaining backoff 231. When remaining backoff 231 expires, STA2 is able to obtain access to the wireless channel and transmits a frame.

In cellular communications systems, e.g., Third Generation Partnership Project (3GPP) Long Term Evolution (LTE) compliant communications systems, orthogonal frequency division multiple access (OFDMA) has been shown to be able to provide robust performance in high density environments. OFDMA has the ability to support multiple users simultaneously by carrying traffic from different users on different portions of the communications system bandwidth. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multiuser multiple input multiple output (UL MU-MIMO) has also been used in cellular communications systems (e.g., 3GPP LTE) to enhance communications system performance. UL MU-MIMO allows multiple users to transmit simultaneously on the same network resource (e.g., time-frequency resource) with the transmissions being separated in space, e.g., on different spatial streams.

In UL OFDMA/MU-MIMO transmission, an AP transmits a trigger frame to the stations to schedule their UL MU transmissions. The trigger frame comprises UL scheduling information, such as station identifiers (STA IDs), corresponding UL resource allocations, modulation and coding scheme (MCS), power control information, and the like for the UL MU transmissions.

A station, upon receiving the trigger frame, will check if it is an intended recipient of the trigger frame (e.g., its STA ID matches with one of the STA IDs listed in the UL scheduling information of the trigger frame). If the station is an intended recipient of the trigger frame, the station may, after a SIFS time after the end of the trigger frame, transmit its data (e.g., data packet) on the allocated UL resource allocation, using the MCS derived in accordance with the one carried in the UL scheduling information, and with a power level adjusted in accordance with the power control information in the UL scheduling information.

The AP, upon receiving the UL data packet(s) from the station(s), will decode the data packet(s) from the station(s) and check if the data packet(s) are received correctly, i.e., it was able to successfully decode the UL data packet(s). If the AP was able to successfully receive the data packet(s), the AP may, after a SIFS time after the end of the UL data transmission, transmit an acknowledgment (ACK) or a Block ACK (BA) frame(s) to the station(s).

Figure 3:
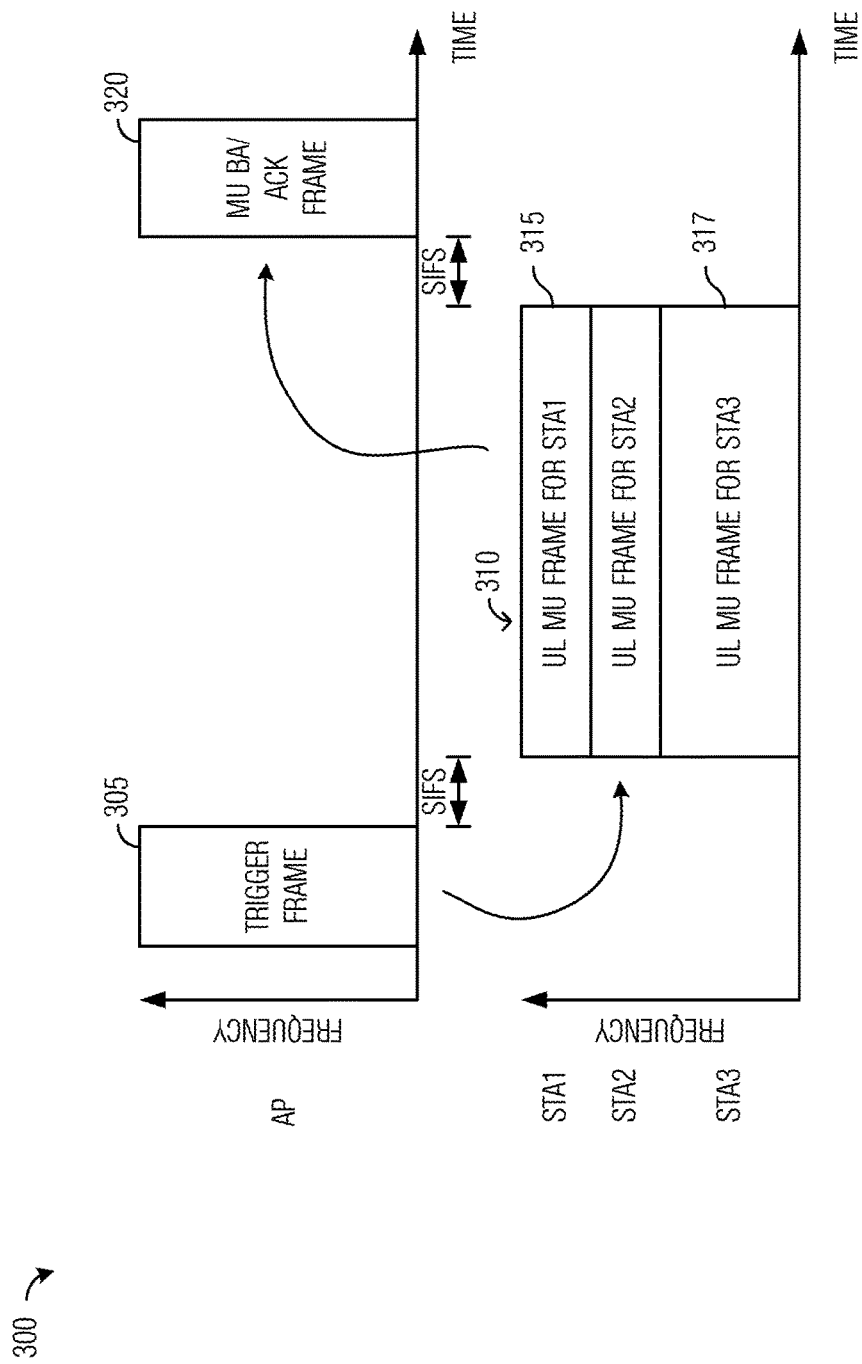
FIG. 3 illustrates a diagram of an example UL OFDMA/MU-MIMO transmission procedure, where OFDMA is used as an example according to example embodiments described herein.

FIG. 3 illustrates a diagram 300 of an example UL OFDMA/MU-MIMO transmission procedure, where OFDMA is used as an example. A trigger frame 305, sent by an AP, is received by a station. The station may check to determine if it is an intended recipient of trigger frame 305. If the station is an intended recipient of trigger frame 305, the station may transmit data (in a data packet 310) in a UL resource allocation indicated in trigger frame 305. Since OFDMA is used, the station may utilize a portion of the UL resource allocation, allowing other stations to utilize other parts of the UL resource allocation. As shown in FIG. 3, STA1 uses a smaller portion (portion 315) of the UL resource allocation than STA3 (portion 317). The AP, after receiving data packet 310 may send ACKs or a BA in an acknowledgement frame 320.

Figure 4:
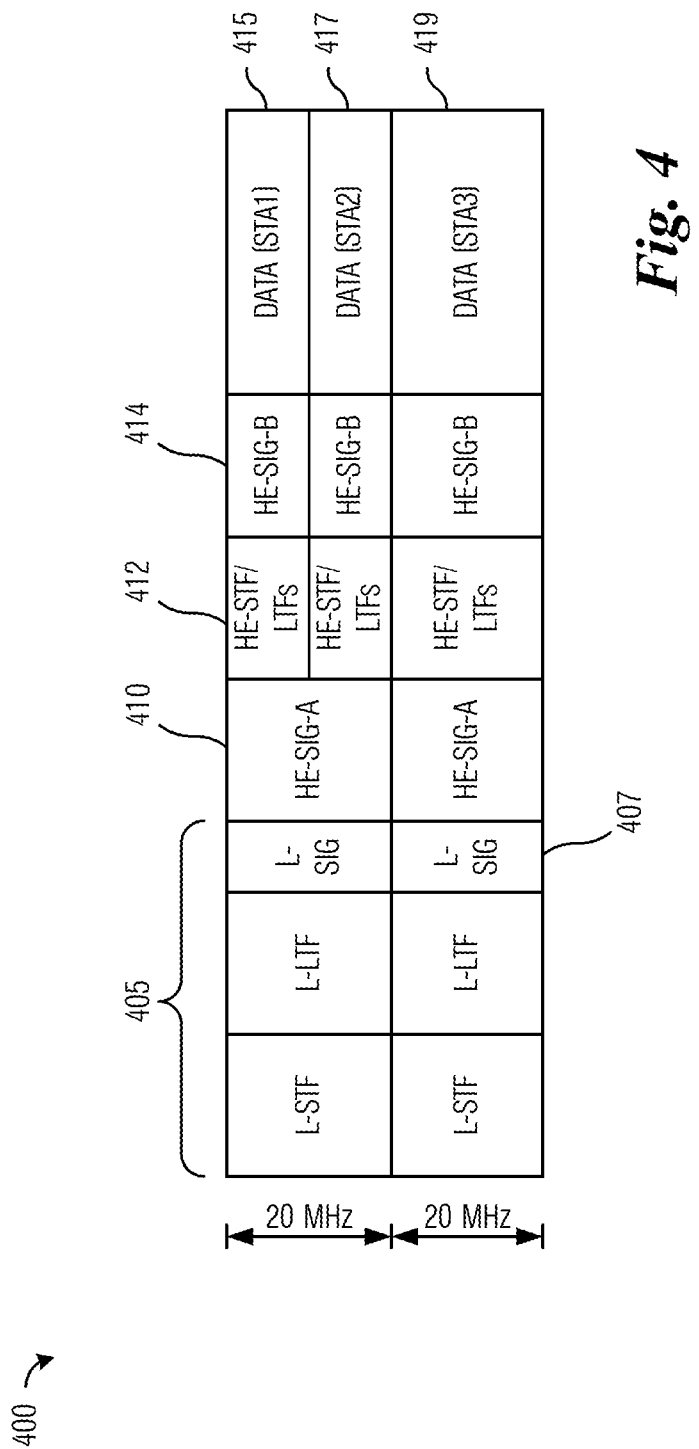
FIG. 4 illustrates a diagram of an example UL transmission, where OFDMA is used as an example according to example embodiments described herein.

FIG. 4 illustrates a diagram of an example UL transmission 400, where OFDMA is used as an example. UL transmission 400 may start with a legacy preamble 405 including L-STF, L-LTF, and L-SIG fields, on a regular bandwidth (e.g., 20 MHz) or on multiple bandwidths, such that the legacy preamble 405 can be understood by both legacy stations and 802.11ax stations. L-SIG fields 407 comprise an indication of the duration of data packet transmission. After legacy preamble 405, there may be high-efficiency signal A (HE-SIG-A) fields 410, comprising common information for 802.11ax stations. HE-SIG-A fields 410 should also be transmitted on a regular bandwidth (e.g., 20 MHz) or multiple bandwidths, such that other 802.11ax stations can receive it without knowing the exact resource allocation information of the data packet. High-efficiency short training field (HE-STF) and high-efficiency long training field (HE-LTF) fields 412 comprise sequences used for training purposes and HE-SIG-B fields 414 include control information, such as data length, MCS level, and so on. As shown in FIG. 4, UL transmission 400 occurs over two 20 MHz bandwidths, with data packets from STA1 (data packet 415) and STA2 (data packet 417) sharing one of the two 20 MHz bandwidths and data packets from STA3 (data packet 419) occupying an entirety of the other 20 MHz bandwidth.

Figure 5:
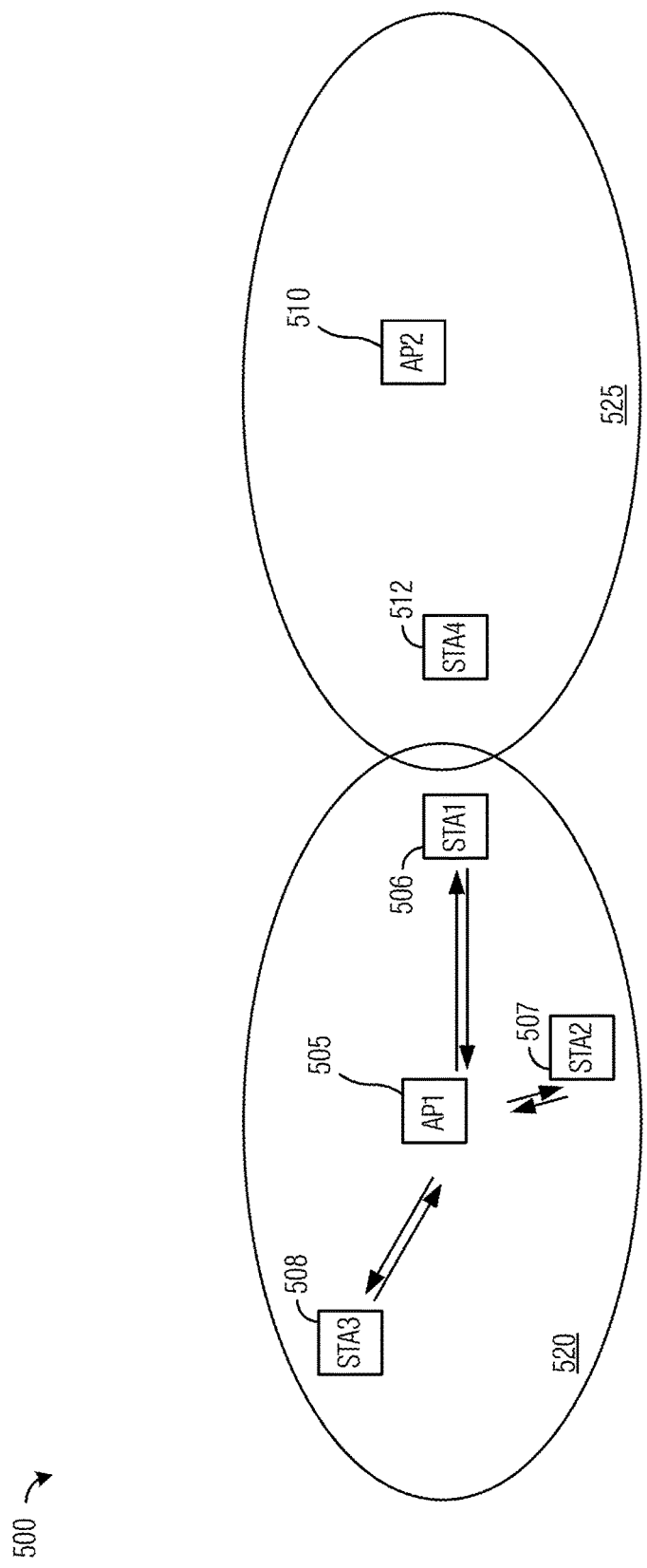
FIG. 5 illustrates an example communications system and highlights interference management therein according to example embodiments described herein.

FIG. 5 illustrates an example communications system 500 and highlights interference management therein. Communications system 500 includes a first AP (AP1) 505 and a second AP (AP2) 510. The two APs have overlapping basic service sets (OBSS), OBSS 520 for AP1 505 and OBSS 525 for AP2 510. Under current EDCA rules, before stations in an OBSS can transmit, they are required to perform a CCA to avoid causing interference to ongoing transmissions. As shown in FIG. 5, a first station (STA1) 506, a second station (STA2) 507, and a third station (STA3) 508 are transmitting to AP1 505 on the UL using UL OFDMA, while a fourth station (STA4) 512 is being served by AP2 510. If STA4 512 wants to transmit on the UL with a single user transmission, it needs to perform a CCA before it can transmit. For discussion purposes, consider a situation where STA1 506 is transmitting on a portion of a first 20 MHz channel (such as shown in FIG. 4, for example) and that STA4 512 also wants to transmit on the first 20 MHz channel. CCA results based on measurements of the first 20 MHz channel will indicate that the first 20 MHz channel is busy. Therefore, STA4 512 will not be able to transmit.

It is noted that since AP1 505 is the intended receiver of transmissions from stations 506-508, which is far away from STA4 512, therefore even if STA4 512 is transmitting while stations 506-508 are transmitting, the interference to AP1 505 from STA4 512 is low and may be tolerable. Hence, STA4 512 may be allowed to transmit while stations 506-508 are transmitting.

However, an interference situation may arise when AP1 505 needs to transmit ACK/BA frames to stations 506-508 after decoding the UL data packets from stations 506-508. In such a situation, stations 506-508 are receivers of the ACK/BA frames from AP1 505. As shown in FIG. 5, STA4 512 is close to STA1 506 and if STA4 512 is transmitting while STA1 506 is receiving the ACK/BA frame, the transmission from STA4 512 may cause significant interference at STA1 506. The interference may potentially cause the reception of the ACK/BA frame at STA1 506 to fail, which may lead STA1 506 to retransmit its data packet(s), previously transmitted to AP1 505 in the UL OFDMA transmissions discussed above, thereby needlessly wasting system resources and degrading system performance.

According to an example embodiment, it is possible to notify a station, such as STA4 512, of the location (e.g., frequency and/or time location of network resources) where the ACK/BA frame(s) will be transmitted beforehand, and STA4 512 can restrain itself from transmitting in the location (e.g., the frequency and/or time location of network resources where the ACK/BA frame(s) are transmitted) and avoid causing interference to the reception of the ACK/BA frame by STA1 506, while reusing a significant portion of the network resources (i.e., those not occupied by the ACK/BA frame(s) or other frames), thereby improving system performance. It is noted that since STA4 512 is far from AP1 505, it may not be able to receive the trigger frame(s) transmitted by AP1 505, so relying on trigger frame(s) transmitted by AP1 505 to inform regarding the location of the network resources associated with the ACK/BA frame(s) is not feasible nor reliable.

According to an example embodiment, a trigger frame includes UL scheduling information and an indicator of network resource usage (i.e., a network resource usage indicator). The UL scheduling information specifies the location of network resources allocated for UL transmission. The network resource usage indicator is used to indicate the location of network resources used to transmit ACK/BA frame(s) associated with the UL transmission. As an example, consider a situation with a total bandwidth of 80 MHz, the indicator may comprise a 4-bit bitmap, with each bit of the 4-bit bitmap representing one 20 MHz bandwidth. So, in a situation where the ACK/BA frames will be transmitted on DL on the first and the second 20 MHz bandwidth (e.g., a total of 40 MHz), the indicator may be a bitmap of "1100" indicating that the first and the second 20 MHz bandwidths are used to transmit the ACK/BA frames.

According to an example embodiment, a station that receives a trigger frame that includes UL scheduling information and an indicator of network resource usage (i.e., a network resource usage indicator) and is allocated a UL transmission in the UL scheduling information (i.e., when the station identifier of the station is listed in the UL scheduling information), transmits both its data packet(s) and the network resource usage indicator in accordance with the UL scheduling information. The inclusion of the network resource usage indicator in the UL transmission may allow devices that are incapable of receiving the trigger frame (e.g., STA4 512) to receive the network resource usage indicator and determine the location of the network resources used to transmit ACK/BA frames associated with the UL transmission, thereby allowing the devices to avoid transmitting in the location of the network resources used to transmit the ACK/BA frames. Although the discussion focuses on avoiding causing interference to ACK/BA frames, the example embodiments presented herein are also operable with avoiding interference to other types of frames.

Figure 6A:
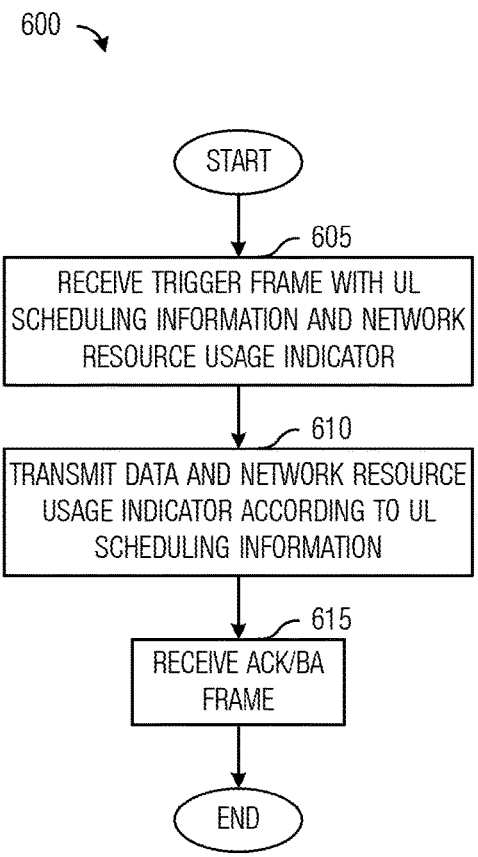
FIG. 6A illustrates a flow diagram of example operations occurring in a station that has been allocated a UL transmission according to example embodiments described herein.

FIG. 6A illustrates a flow diagram of example operations 600 occurring in a station that has been allocated a UL transmission. Operations 600 may be indicative of operations occurring in a station that has been allocated a UL transmission, such as stations 506-508 of FIG. 5.

Operations 600 may begin with the station receiving a trigger frame from an AP (block 605). The trigger frame may include UL scheduling information, which may include an indication of resource allocation (e.g., resource locations (time and/or frequency)) for a UL transmission for the station. The trigger frame may also include a network resource usage indicator. The network resource usage indicator may comprise an indication of the resource(s) that will be used to transmit ACK/BA frames corresponding to the UL transmission. As an illustrative example, in a situation with a total bandwidth of 80 MHz, the indicator may comprise a 4-bit bitmap, with each bit representing one 20 MHz bandwidth. So, in a situation where the ACK/BA frames will be transmitted on DL on the first and the second 20 MHz bandwidth (e.g., a total of 40 MHz), the indicator may be a bitmap of "1100" indicating that the first and the second 20 MHz bandwidths are used to transmit the ACK/BA frames. In another situation where the ACK/BA frames will be transmitted on DL on the second 20 MHz bandwidth (e.g., a total of 20 MHz), the indicator may be a bitmap of "0100" indicating that the second 20 MHz bandwidth is used to transmit the ACK/BA frames.

The station transmits its data packet(s) and the network resource usage indicator in accordance with the UL scheduling information of the station (block 610). As an illustrative example, the network resource usage indicator is transmitted in the HE-SIG-A field, where common information of the UL OFDMA stations is carried. Since HE-SIG-A field is transmitted in a regular bandwidth (e.g., 20 MHz), other stations such as the stations in other OBSS s (e.g., STA4 512 of FIG. 5) can receive the HE-SIG-A field without knowledge of the UL scheduling information. The station may receive an ACK/BA frame (block 615). The ACK/BA frame is received in accordance with the network resource usage indicator.

Figure 6B:
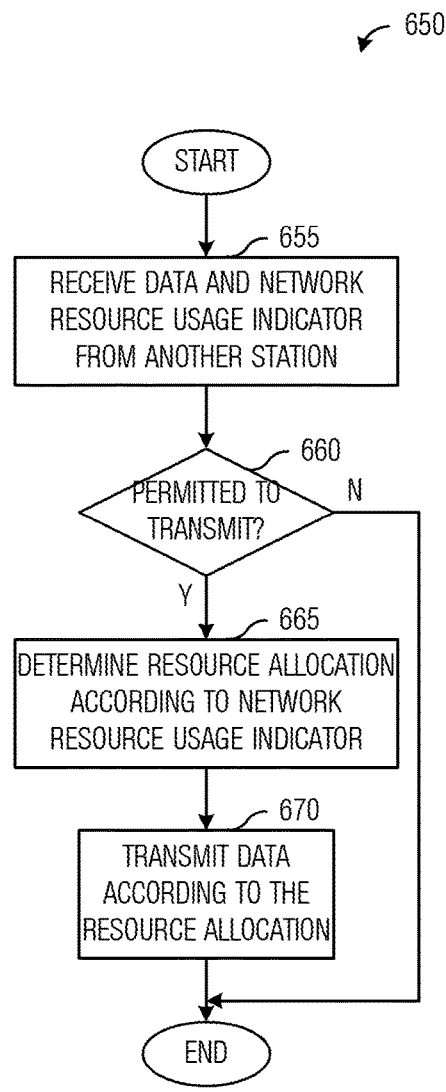
FIG. 6B illustrates a flow diagram of example operations occurring in a first station that is operating in another OBSS according to example embodiments described herein.

FIG. 6B illustrates a flow diagram of example operations 650 occurring in a first station that is operating in another OBSS. Operations 650 may be indicative of operations occurring in a first station that is operating in another OBSS, such as STA4 512 of FIG. 5.

Operations 650 may begin with the first station receiving the data packet(s) and the network resource usage indicator transmitted by a second station that is operating in a different OBSS (block 655). The first station may perform a check to determine if it is permitted to transmit its own data simultaneously with the second station's UL transmission (block 660). As an illustrative example, the first station is able to receive a trigger frame transmitted by an AP serving the second station, it should not transmit its data simultaneously with the ACK/BA frame as indicated by the network resource usage indicator since the first station's ability to receive the trigger frame indicates that the link between the AP serving the second station and the first station is good and if the first station was allowed to transmit, it could cause significant interference to the second station's ability to receive the ACK/BA frame. As another illustrative example, the first station is able to receive the trigger frame transmitted by the AP, it should not transmit its data simultaneously with the UL transmission of the second station since it could cause significant interference to the AP's ability to receive the transmissions of the second station. As yet another illustrative example, the first station is not able to receive the trigger frame, the first station may be allowed to transmit its data simultaneously with the transmission of the second station. Since the first station is not able to receive the trigger frame from the AP serving the second station, the link between the first station and the AP serving the second station is likely to be poor and the first station would not likely cause significant interference to the AP of the second station.

If the first station is permitted to transmit (block 660), the first station may determine a resource allocation for its UL transmission in accordance with the network resource usage indicator (block 665). As an illustrative example, the resource allocation should be different from the one used for the ACK/BA frame transmission corresponding to the second station's UL transmission as indicated in the network resource usage indicator, in order to avoid causing interference to the second station's ability to receive the ACK/BA frame. Referring back to the previously discussed example of the network resource usage indicator being in a 4-bit bitmap of "1100", the first station may select network resources of one or both of the 20 MHz bandwidths indicated by the two "0"s in the indication of network resource usage for its own UL transmission. The first station may transmit its UL transmission on the selected network resources (block 670). If the first station is not permitted to transmit, operations 650 may terminate.

Figure 7:
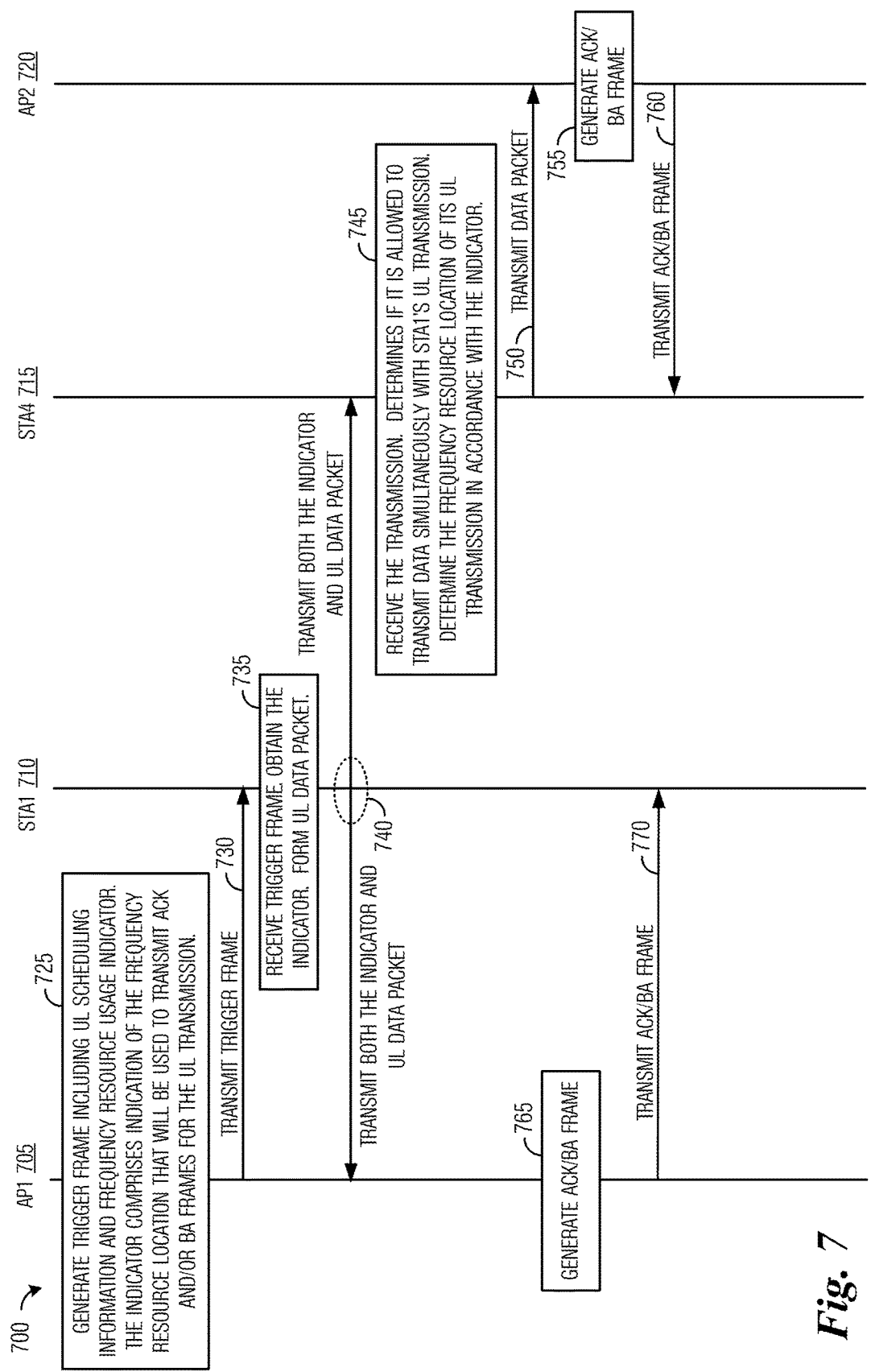
FIG. 7 illustrates a diagram of example messages exchanged and operations occurring in stations and APs in accordance with example embodiments for managing interference according to example embodiments described herein.

FIG. 7 illustrates a diagram 700 of example messages exchanged and operations occurring in stations and APs in accordance with example embodiments for managing interference. Diagram 700 displays messages exchanged between an AP1 705, a STA1 710, a STA4 715, and an AP2 720. As shown in FIG. 7, STA1 710 is served by AP1 705, while STA4 715 is served by AP2 720. AP1 705 generates a trigger frame (block 725). The trigger frame includes UL scheduling information for one or more stations, including STA1 710, as well as a frequency resource usage indicator that indicates frequency resources that will be used to transmit ACK/BA frame(s) associated with the UL transmissions made by the one or more stations. AP1 705 transmits the trigger frame (shown as event 730). STA1 710 receives the trigger frame and obtains the frequency resource usage indicator included therein (block 735). STA1 710 transmits UL data packet(s) and the frequency resource usage indicator (shown as event 740). Both AP1 705 and STA4 715 receive the UL data packet(s) and/or the frequency resource usage indicator.

STA4 715 receives the transmission from STA1 710 and determines if it is allowed to transmit data simultaneously with the transmission (block 745). STA4 715 also determines the frequency resource for its own transmission in accordance with the frequency resource usage indicator. As discussed previously, STA4 may be able to determine if it is allowed to transmit data simultaneously with the transmission of STA1 710 based on its ability to receive the trigger frame transmitted by AP1 705. If STA4 715 was able to receive the trigger frame, then it is not able to simultaneously transmit, while if STA4 715 was not able to receive the trigger frame, then it may be able to simultaneously transmit, for example.

If STA4 715 is able to simultaneously transmit, STA4 715 transmits its data packet(s) in frequency resource(s) that it determined according to the frequency resource usage indicator (shown as event 750). AP2 720 receives the transmission from STA4 715 and generates an ACK/BA frame(s) (block 755) and transmits the ACK/BA frame(s) (shown as event 760). The ACK/BA frame(s) from AP 720 may be sent in frequency resources determined to avoid interference to other devices and transmissions in a manner similar to how the frequency resources for the UL transmission of STA4 715 are determined.

AP1 705 receives the UL transmissions from the one or more stations including STA1 710 and generates an ACK/BA frame(s) (block 765) and transmits the ACK/BA frame(s) in frequency resources as indicated by the frequency resource usage indicator (shown as event 770).

According to an example embodiment, an AP's ACK/BA frame occupies different network resources from those used to transmit UL OFDMA frames to reduce interference. When an AP (e.g., AP2 510) transmits a ACK/BA frame in response to a station's (e.g., STA4 512) UL data transmission while other stations' (e.g., stations 506-508) UL OFDMA transmission is still ongoing, the UL OFDMA transmission may cause significant interference to the stations' reception of the ACK/BA frame. In order to avoid the interference, the network resource location of the AP's transmission of the ACK/BA frame to the stations is selected so that it is different from those used by the UL OFDMA transmission of the stations.

According to an example embodiment, the station also receives an indicator (i.e., a network resource location indicator) of a network resource location that is used for the stations' (e.g., stations 506-508) UL OFDMA transmission. This may be achieved in several ways:

1: The indicator carried in the trigger frame further comprises a network resource location indicator indicating the network resource location that is used for UL OFDMA transmission. As an illustrative example, assuming a total bandwidth of 80 MHz with 20 MHz channel bandwidths, the network resource location indicator could comprise a 4-bit bitmap, with each bit representing one 20 MHz bandwidth. Therefore, in a situation when the UL OFDMA transmission will be transmitted on UL on the $2^{nd}$, $3^{rd}$ and $4^{th}$ 20 MHz bandwidth (e.g., a total of 60 MHz bandwidth), a bitmap of "0111" is used.

2: The indicator carried in the trigger frame comprises only the network resource location that will be used to transmit ACK/BA frames associated with the UL transmission (i.e., the network resource usage indicator). However, the station (e.g., STA1 506), after receiving the trigger frame, also obtains the information about the network resource location that is used for UL OFDMA transmission, and adds an indicator of the information about the network resource location (i.e., the network resource location indicator) to the indicator it sends on the UL in its UL OFDMA transmission. Therefore, the indicator as transmitted in the UL by the station includes both the network resource usage indicator and the network resource location indicator.

Figures 8A, 8B:
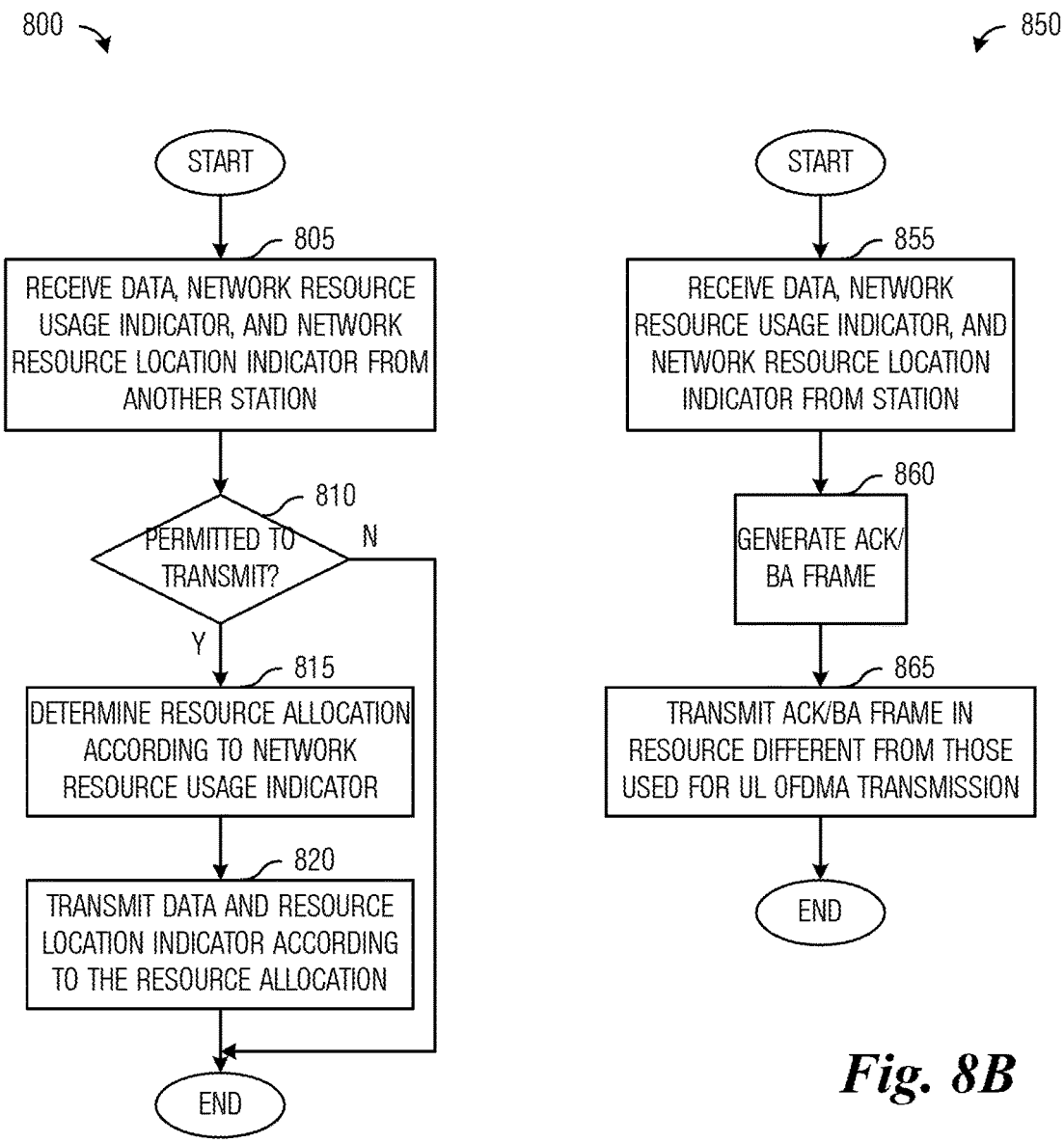
FIG. 8A illustrates a flow diagram of example operations occurring in a first station participating in interference management according to example embodiments described herein.
FIG. 8B illustrates a flow diagram of example operations occurring in an AP participating in interference management according to example embodiments described herein.

FIG. 8A illustrates a flow diagram of example operations 800 occurring in a first station participating in interference management. Operations 800 may be indicative of operations occurring in a first station, such as STA4 512, participating in interference management.

Operations 800 may begin with the first station receiving the data packet(s), the network resource usage indicator, and the network resource location indicator transmitted by a second station in a different OBSS (block 805). The first station may perform a check to determine if it is permitted to transmit its own data simultaneously with the second station's UL transmission (block 810). As an illustrative example, if the first station is able to receive a trigger frame from an AP serving the second station, it should not transmit its data simultaneously with the second station's transmission since the first station's ability to receive the trigger frame indicates that the link between the AP of the second station and the first station is good and if the first station was allowed to transmit, it could cause significant interference to the AP's ability to receive the transmissions of the second station. As another illustrative example, the first station is not able to receive the trigger frame from the AP serving the second station, the first station may be allowed to transmit its data simultaneously with the transmission of the second station.

If the first station is permitted to transmit (block 810), the first station may determine a resource allocation for its UL transmission in accordance with the network resource usage indicator (block 815). The first station may transmit its UL transmission, along with an indicator of network resource location, on the selected network resources (block 820). If the first station is not permitted to transmit, operations 800 may terminate.

FIG. 8B illustrates a flow diagram of example operations 850 occurring in an AP participating in interference management. Operations 850 may be indicative of operations occurring in an AP, such as AP2 510, participating in interference management.

Operations 850 may begin with the AP receiving data and a network resource location indicator from a station (block 855). The network resource location indicator may indicate network resource locations used by other stations, such as stations 506-508, for UL OFDMA transmission. The AP may generate an ACK/BA frame in accordance with the transmission received from the station (block 860). The AP may transmit the ACK/BA frame to the station on network resources different from those indicated by the network resource location indicator (block 865). As an illustrative example, if the network resource location indicator is a bit map of "0111" indicating that the $2^{nd}$, $3^{rd}$, and $4^{th}$ 20 MHz bandwidth channels (e.g., a total of 60 MHz bandwidth) are used for UL OFDMA transmission, the AP may send the ACK/BA frame on the first 20 MHz bandwidth, which corresponds to the "0" of the network resource location indicator.

Figure 9:
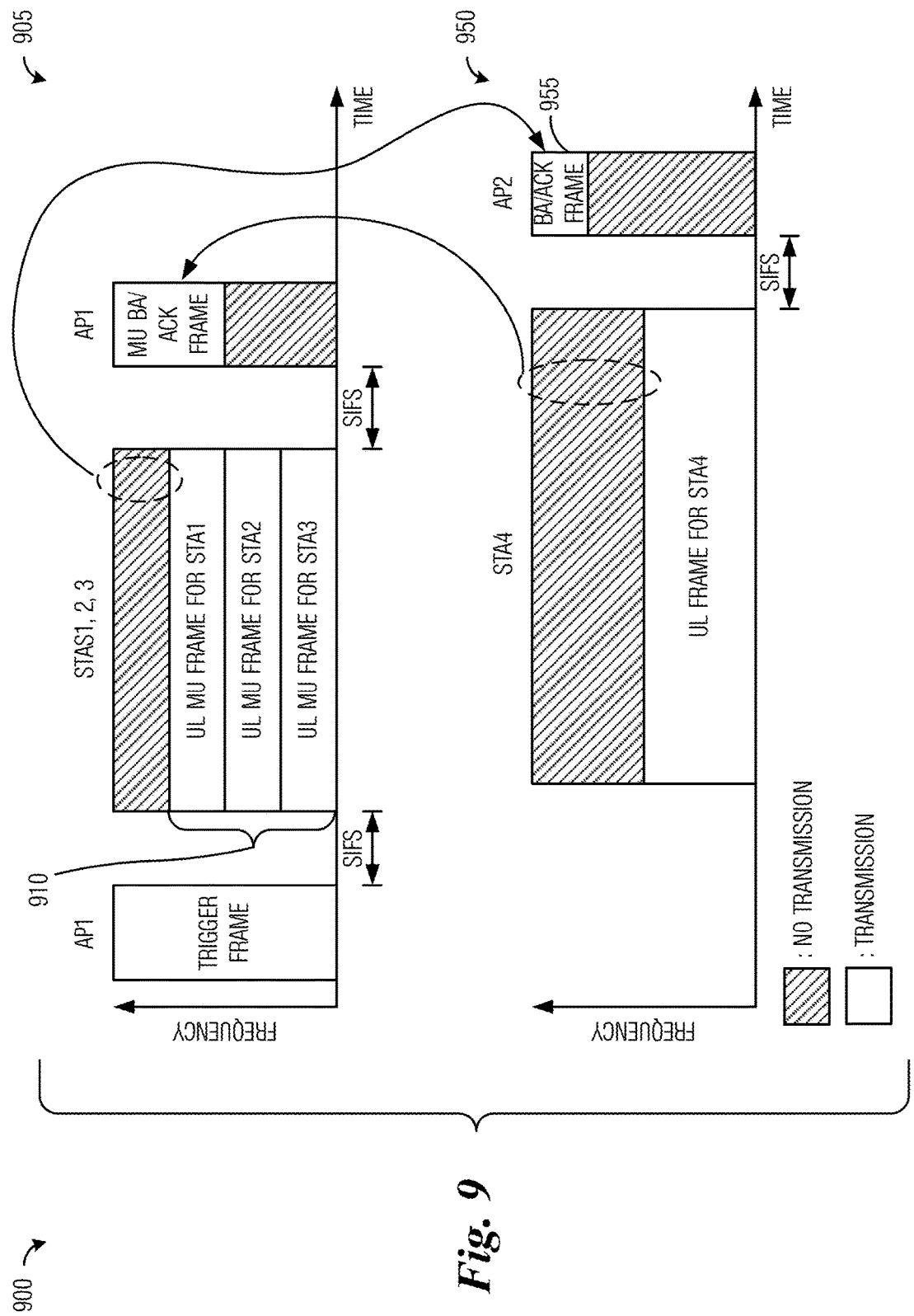
FIG. 9 illustrates example time-frequency graphs highlighting transmissions by stations and APs according to example embodiments described herein.

FIG. 9 illustrates example time-frequency graphs 900 highlighting transmissions by stations and APs. A first time-frequency graph 905 illustrates transmissions by a first AP (e.g., AP1 505) and a plurality of stations (e.g., stations 506-508), while a second time-frequency graph 950 illustrates transmissions by a second AP (e.g., AP2 510) and a station (e.g., STA4 512). As shown in FIG. 9, cross-hatched boxes indicate network resources without transmissions and blank boxes indicate network resources with transmissions. A transmission of an ACK/BA frame by AP2 510 may occur in a 20 MHz bandwidth not used by STA1-3, such as network resource 955, to avoid interfering with the reception of the ACK/BA frame at STA4 by transmissions of STA1-3 (shown as network resources 910). It is noted that the time axes of the time-frequency graphs 900 are not drawn to scale.

According to an example embodiment, the network resource usage indicator used to indicate network resource locations used to transmit ACK/BA frames for UL transmission is carried in a system information frame (e.g., a beacon frame) rather than a trigger frame. Such a configuration allows the network resource location of the ACK/BA frames to remain constant for at least a single beacon interval until it is updated in a new beacon frame.

Figure 10:
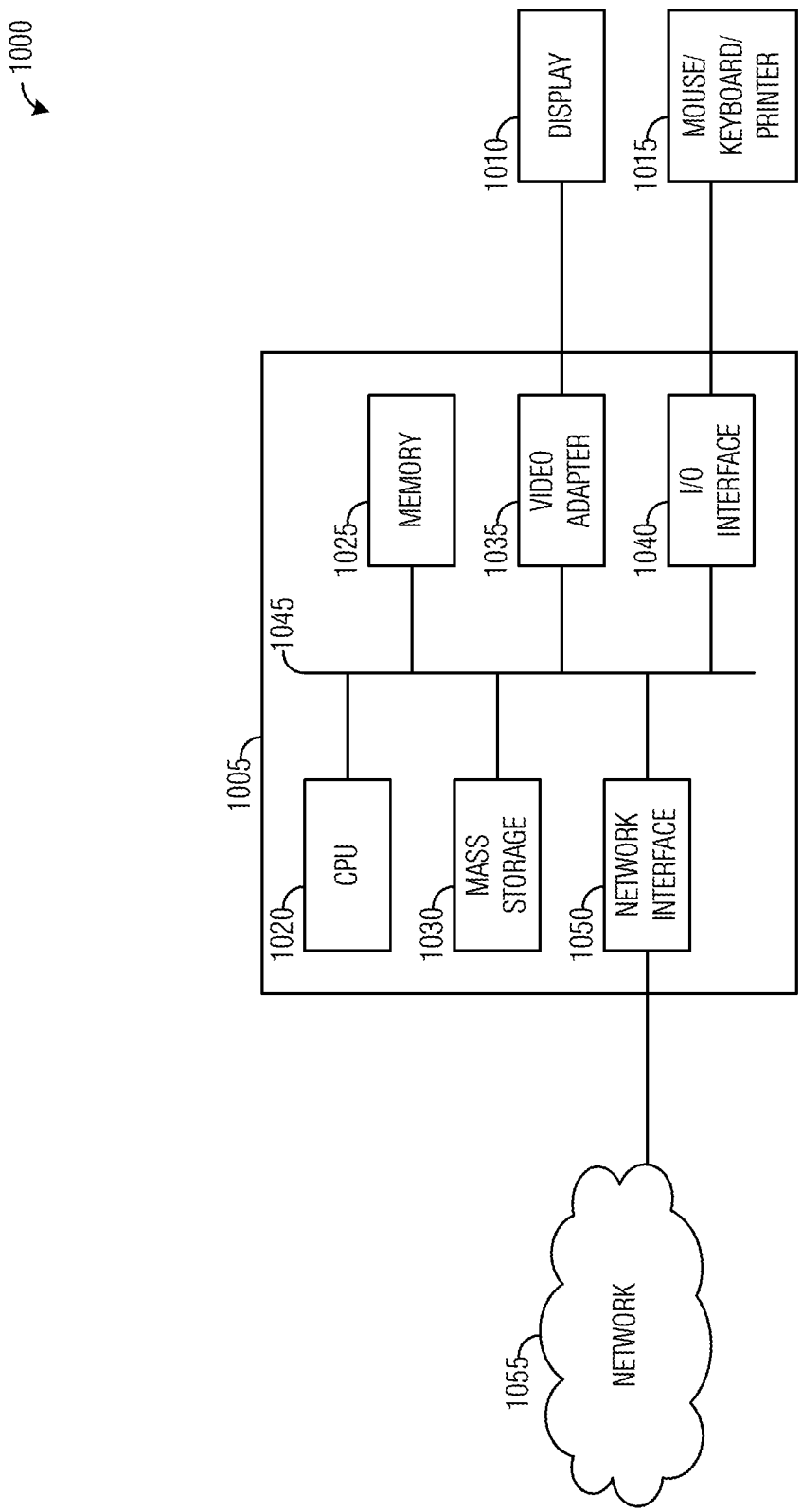
FIG. 10 is a block diagram of a processing system that may be used for implementing the devices and methods disclosed herein.

FIG. 10 is a block diagram of a processing system 1000 that may be used for implementing the devices and methods disclosed herein. In some embodiments, the processing system 1000 comprises a UE. In other embodiments, the processing system 1000 comprises a network controller. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 1015 (including speaker, microphone, mouse, touchscreen, keypad, keyboard, printer, and the like), display 1010, and so on. The processing unit may include a central processing unit (CPU) 1020, memory 1025, a mass storage device 1030, a video adapter 1035, and an I/O interface 1040 connected to a bus 1045.

The bus 1045 may be one or more of any type of several bus architectures including a memory bus or memory controller, a peripheral bus, video bus, or the like. The CPU 1020 may comprise any type of electronic data processor. The memory 1025 may comprise any type of system memory such as static random access memory (SRAM), dynamic random access memory (DRAM), synchronous DRAM (SDRAM), read-only memory (ROM), a combination thereof, or the like. In an embodiment, the memory 1025 may include ROM for use at boot-up, and DRAM for program and data storage for use while executing programs.

The mass storage device 1030 may comprise any type of storage device configured to store data, programs, and other information and to make the data, programs, and other information accessible via the bus 1045. The mass storage device 1030 may comprise, for example, one or more of a solid state drive, hard disk drive, a magnetic disk drive, an optical disk drive, or the like.

The video adapter 1035 and the I/O interface 1040 provide interfaces to couple external input and output devices to the processing unit 1005. As illustrated, examples of input and output devices include the display 1010 coupled to the video adapter 1035 and the mouse/keyboard/printer 1015 coupled to the I/O interface 1040. Other devices may be coupled to the processing unit 1005, and additional or fewer interface devices may be utilized. For example, a serial interface such as Universal Serial Bus (USB) (not shown) may be used to provide an interface for a printer.

The processing unit 1005 also includes one or more network interfaces 1050, which may comprise wired links, such as an Ethernet cable or the like, and/or wireless links to access nodes or different networks 1055. The network interface 1050 allows the processing unit 1005 to communicate with remote units via the networks 1055. For example, the network interface 1050 may provide wireless communication via one or more transmitters/transmit antennas and one or more receivers/receive antennas. In an embodiment, the processing unit 1005 is coupled to a local-area network or a wide-area network 1055 for data processing and communications with remote devices, such as other processing units, the Internet, remote storage facilities, or the like.

Figure 11:
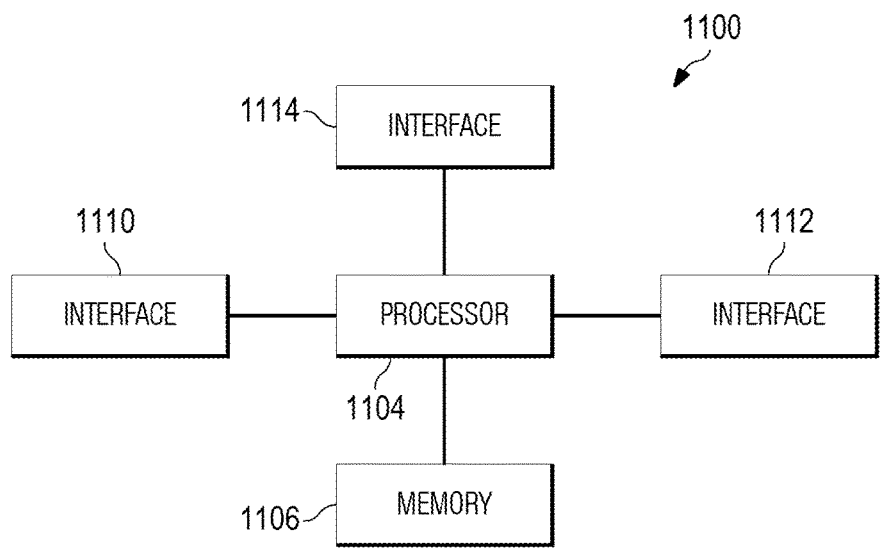
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
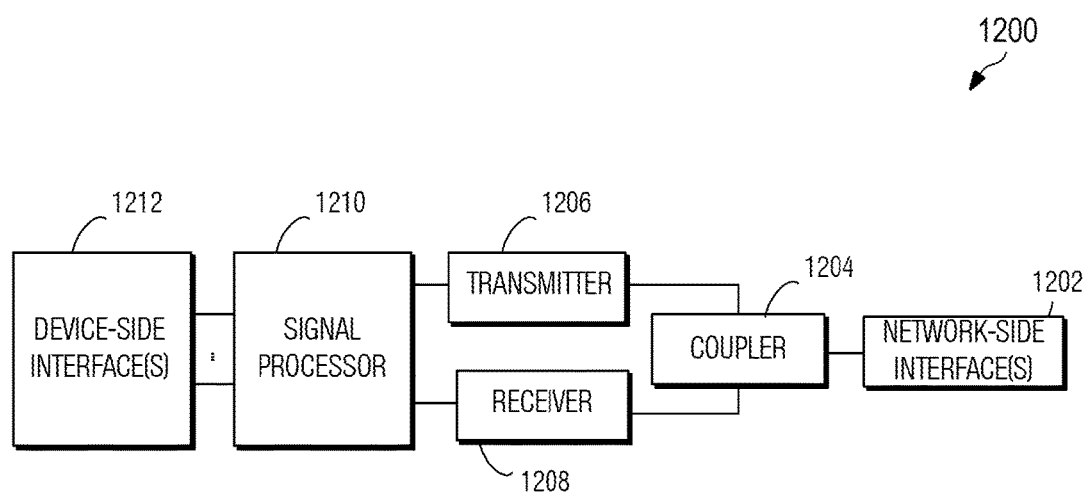
FIG. 12 illustrates a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for communicating in a wireless communications system, the method comprising:
    receiving, by a station, an indicator indicating a utilization of network resources for carrying acknowledgement information, the indicator identifying a first location of a first network resource; and
    determining, by the station, that the station has not received a trigger frame prior to receiving the indicator and, based thereon, transmitting a packet over the first location of the first network resource.

2. The method of claim 1, further comprising
    determining, by the station, that the station has not received the trigger frame prior to receiving the indicator.

3. The method of claim 1, wherein the indicator indicates a second location of a second network resource for carrying the acknowledgement information.

4. The method of claim 3, wherein identifying the first location of the first network resource in accordance with the indicator comprises selecting, by the station, the first location that does not include the second location.

5. The method of claim 1, wherein the indicator further indicates a third location of a third network resource for a transmission.

6. The method of claim 5, wherein transmitting the packet comprises transmitting, by the station, the indicator.

7. The method of claim 6, further comprising receiving, by the station, a second acknowledgement information responsive to the packet, wherein the second acknowledgement information is received in accordance with the indicator.

8. The method of claim 7, wherein receiving the second acknowledgement information comprises receiving, by the station, the second acknowledgement information at a fourth location of a fourth network resource that does not include the third location.

9. A method for communicating in a wireless communications system, the method comprising:
    receiving, by a first station, a first indicator from a second station, the first indicator indicating a utilization of a first set of network resources by the second station;
    transmitting, by the first station, a first transmission to an access point, that does not serve the second station, the first transmission indicating that the first set of network resources are being utilized by the second station; and
    receiving, by the first station, acknowledgement information responsive to the first transmission, the acknowledgement information received from the access point over a second set of network resources, the second set of network resources being different from the first set of network resources.

10. The method of claim 9, wherein the first indicator comprises a network resource usage indicator.

11. The method of claim 9, wherein the first indicator comprises a network resource location indicator.

12. The method of claim 9, wherein the first indicator further indicates a first location of a first network resource carrying a second acknowledgement information.

13. The method of claim 9, wherein the first indicator further indicates a second location of a second network resource carrying a second transmission, the second transmission transmitted from the second station to a second access point, that does not serve the first station.

14. The method of claim 13, wherein the first transmission carries the first indicator.

15. The method of claim 9, wherein the first transmission carries the first indicator.

16. The method of claim 9, wherein the first transmission carries a second indicator that indicates a third location of a third network resource carrying a third transmission including a second acknowledgement information and a third indicator of a fourth location of a fourth network resource carrying a second transmission.

17. The method of claim 9, wherein the first indicator comprises a bitmap with each bit of the bitmap representing utilization of a portion of the first set of network resources.

18. The method of claim 9, wherein transmitting the first transmission comprises transmitting a second indicator in a preamble of the first transmission, the second indicator indicating that the first set of network resources are being utilized by the second station.

19. The method of claim 18, wherein the preamble comprises a high-efficiency signal A (HE-SIG-A) field.

20. A method for communicating in a wireless communications system, the method comprising:
   receiving, by an access point, a first transmission from a first station, the first transmission indicating that a first set of network resources are being utilized by a second station that is not served by the access point; and
   transmitting, by the access point, acknowledgement information to the first station over a second set of network resources in response to receiving the first transmission, the second set of network resources being different than the first set of network resources.

21. The method of claim 20, wherein the first transmission carries an indicator indicating that the first set of network resources are being utilized by the second station.

22. The method of claim 20, wherein the first transmission carries an indicator indicating that the first set of network resources are being used by the second station, the indicator comprising a first network resource usage indicator.

23. The method of claim 20, wherein the first transmission carries an indicator indicating that the first set of network resources are being used by the second station, the indicator comprising a first network resource location indicator.

24. The method of claim 23, wherein the indicator further comprises a second network resource location indicator and a second network resource usage indicator.

25. A station adapted to communicate in a wireless communications system, the station comprising:
   a processor; and
   a computer readable storage medium storing programming for execution by the processor, the programming including instructions to configure the station to:
      receive an indicator indicating a utilization of network resources for carrying acknowledgement information, the indicator identifying a first location of a first network resource, and
      determine that the station has not received a trigger frame prior to receiving the indicator and, based thereon, transmit a packet over the first location of the first network resource.

26. The station of claim 25, wherein programming includes instructions to determine that the station has not received the trigger frame prior to receiving the indicator.

27. The station of claim 25, wherein the indicator indicates a second location of a second network resource for carrying the acknowledgement information.

28. The station of claim 27, wherein programming includes instructions to select the first location that does not include the second location.

29. The station of claim 25, wherein the indicator further indicates a third location of a third network resource for a transmission.

30. The station of claim 29, wherein programming includes instructions to transmit the indicator.

31. The station of claim 30, wherein programming includes instructions to receive a second acknowledgement information responsive to the packet, wherein the second acknowledgement information is received in accordance with the indicator.

32. The station of claim 31, wherein programming includes instructions to receive the second acknowledgement information at a fourth location of a fourth network resource that does not include the third location.

33. The station of claim 25, wherein the wireless communications system is an IEEE 802.11 compliant wireless local area network (WLAN).

* * * * *